(12) United States Patent
Onishi et al.

(10) Patent No.: US 8,798,918 B2
(45) Date of Patent: Aug. 5, 2014

(54) NAVIGATION SYSTEM, ROUTE SEARCH SERVER, ROUTE SEARCH METHOD AND ROUTE SEARCH PROGRAM

(75) Inventors: Keisuke Onishi, Tokyo (JP); Shin Kikuchi, Tokyo (JP); Kenichi Aihara, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 1472 days.

(21) Appl. No.: 11/328,447

(22) Filed: Jan. 10, 2006

(65) Prior Publication Data

US 2006/0241857 A1 Oct. 26, 2006

(30) Foreign Application Priority Data

Apr. 20, 2005 (JP) ................. 2005-122987

(51) Int. Cl.
*G06F 19/00* (2011.01)
(52) U.S. Cl.
USPC ............ 701/420; 701/430; 701/438; 701/467
(58) Field of Classification Search
USPC ......... 701/208, 211, 213, 400, 409, 410, 420, 701/426, 468, 408, 412, 416, 418, 430, 431, 701/438, 467; 340/995.14, 988
See application file for complete search history.

(56) References Cited

U.S. PATENT DOCUMENTS

| | | | |
|---|---|---|---|
| 6,941,220 B2 * | 9/2005 | Le et al. ................. | 701/208 |
| 7,149,626 B1 * | 12/2006 | Devries et al. ............. | 701/211 |
| 2004/0039523 A1 * | 2/2004 | Kainuma et al. ............ | 701/208 |
| 2004/0100460 A1 * | 5/2004 | Yamada et al. ............. | 345/204 |
| 2005/0270306 A1 * | 12/2005 | Nomura .................. | 345/619 |
| 2007/0276597 A1 * | 11/2007 | Kato et al. ................ | 701/211 |

FOREIGN PATENT DOCUMENTS

| | | |
|---|---|---|
| JP | 2000-258184 | 9/2000 |
| JP | 2000-292184 | 10/2000 |
| JP | 2003-14481 | 1/2003 |
| JP | 2003-57057 | 2/2003 |
| JP | 2003-148983 | 5/2003 |
| JP | 2003-182578 | 7/2003 |
| JP | 2003-337034 A | 11/2003 |

OTHER PUBLICATIONS

WO 2005093372, Published to the publiic Oct. 6, 2005.*
International Search Report of PCT/JP2005/007964, mailed Aug. 16, 2005.
European Office Action dated Jan. 18, 2012, issued in corresponding European Patent Application No. 05737211.2.

* cited by examiner

*Primary Examiner* — Ronnie Mancho
(74) *Attorney, Agent, or Firm* — Westerman, Hattori, Daniels & Adrian, LLP

(57) ABSTRACT

An example navigation system enables searching for an optimum route through a one-time route searching process where several destination or departure locations exist. The navigation system includes a point of interest (POI) attribute information database for accumulating POI attribute information, a network data edit unit and a virtual node setup unit. The navigation system determines whether there is a plurality of POIs in a certain departure location and/or a destination location by making reference to relevant data in the POI attribute information database. If there are several POIs, the virtual node setup unit sets up a virtual node connected to each node of the plurality of POIs through links having identical link cost. The network data edit unit then adds the virtual node to the searching network data, and a route search unit functions to search for routes using the searching network data containing the added virtual node.

15 Claims, 12 Drawing Sheets

| POI | LOCATION COORDINATES | ATTRIBUTE INFORMATION | | | | | |
|---|---|---|---|---|---|---|---|
| | | POI TYPE | NUMBER OF CONNECTION NODES | LOCATION 1 | LOCATION 2 | LOCATION 3 | LOCATION N |
| A | *** | THEME PARK A | NUMBER OF NODES 3 | *** | *** | *** | |
| B | *** | EVENT SITE B | NODE 2 | *** | *** | | |
| C1 | *** | PARKING LOT 1 | | | | | |
| C2 | *** | PARKING LOT 2 | | | | | |
| : | | | | | | | |
| Cn | *** | PARKING LOT 3 | | | | | |
| D1 | *** | GAS STATION 1 | | | | | |
| D2 | *** | GAS STATION 2 | | | | | |
| : | | | | | | | |
| Dn | *** | GAS STATION 3 | | | | | |
| E1 | *** | CONVENIENCE STORE 1 | | | | | |
| : | | | | | | | |
| J1 | *** | STATION 1 | NUMBER OF NODES 3 | *** | *** | *** | |
| : | | | | | | | |
| Z | *** | | | | | | |

F I G. 3  PRIOR ART

FIG. 12
Prior Art
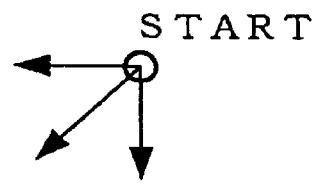
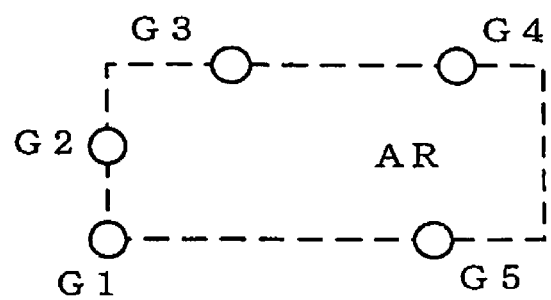

NAVIGATION SYSTEM, ROUTE SEARCH SERVER, ROUTE SEARCH METHOD AND ROUTE SEARCH PROGRAM

BACKGROUND OF THE INVENTION

1. Field of the Invention

The present invention relates to a navigation system, a route search server, a route search method, and a route search program that can search and guide an optimum route from a departure location to a destination location and, more particularly, to a navigation system, a route search server, a route search method, and a route search program that enables searching an optimum route through a one-time route searching process in a case where several destination or departure locations exist.

Route searching for several destination locations or departure locations refers to route searching for certain locations having a number of possible approaches or entry points, such as a theme park, an event site, or a station of a vehicular means of transportation, and further includes route searching for a point of interest (POI), such as a convenience store or a gas station near a current location or a destination location.

2. Description of the Related Art

Conventionally, a navigation device and a navigation system are widely known to be configured to determine possible routes from a designated departure location to a desired destination location to guide users.

The abovementioned navigation device has been practically applied as a car navigation device incorporated in a car providing route guide information to drivers, while the above mentioned navigation system has been practically applied as a communication type navigation system, which sends a route search and guide request to a route search server by means of a mobile phone functioning as a navigation terminal and receives the result in response to the request to provide route guide service.

In particular, the abovementioned communication type navigation system uses a mobile terminal, such as a mobile phone as a navigation terminal, and is applied as a navigation system for pedestrians. The navigation system designed for pedestrians preferably includes a route guide function in respect of transportation facilities. The navigation system for pedestrians provides traveling and walking route searching and route guide information using road network data and accumulates transportation facility routes as well as timetable data in the route search server as traffic network data.

This type of navigation system for pedestrians is equipped with a function for providing route guides from a designated train departure station to a desired train destination station (candidate trains for boarding) in addition to the function of searching and providing walking route guides. In addition, this navigation system includes a traffic guide network which receives and displays information on accessible means of transportation routes and timetables, available trains and the like from an information distribution server without searching for walking routes.

Further, this kind of navigation system is also equipped with a route search system which searches and provides route guides from a designated departure location to a desired destination location using aircraft, trains, electric trains, or buses. Such a route search system generally searches for routes based on route searching conditions or the user's requirements such as departure date and time schedules, departure locations, destination locations, arrival time and the like.

In other words, the navigation system refers to the provision of traffic network data consisting of route and timetable data pertaining to each of the abovementioned transportation facilities compiled into a database to sequentially search available transportation routes from a designated departure location to a desired destination location including required transfers, and one or more prospective transportation route guides (pertaining to trains, for example) conforming to route searching requirements, which generally relate to travel time, frequency of transfers, fare and the like.

Using the above mentioned road network data to search for travel routes from a certain departure location to a particular destination location, the system calculates the total travel cost in terms of distance or time and determines the minimum cost route which is deemed to be the optimum route and draws up route guide data.

Aside from providing information on the optimum route, the route guide data includes map data and guidance data. In compliance with a search request, route guide data is retrieved from a guide data storage facility and displayed on a display means.

Using a GPS receiver incorporated in the navigation device, a route guide and a mark indicating the current location of the navigation device are generally superposed on a scaled map in such manner that the current location indicator is located in the center of the display screen.

When information given on locational positions using the GPS receiver is in error, such as when a current location deviates from a guided route, a route matching process ensues to shift the current location onto the guided route. Alternatively, corrective route matching occurs or a map matching process takes place to bring the current location to the nearest road on the map.

Also, the route guide data includes a guiding point such as an intersection or a landmark, and so forth. When voice guidance data, such as a voice message saying "An intersection is located 300 meters ahead. Please turn left" is introduced at the guiding point, the same is reproduced and outputted via a speaker.

The above-mentioned navigation system and route search method are disclosed in Japanese Unexamined Patent Publication No. 2000-258184 (refer to FIG. 4) and entitled "Method and Device for Searching Traffic Network Route".

Using a computer, the route search navigation system under the abovementioned patent publication searches for walking zones and available transportation facilities at minimum cost in accordance with a label determination method, whereby determined routes from a departure location to a destination location are represented as road and traffic network data in which locations are represented as nodes and routes between adjacent nodes are represented as links.

On the other hand, under the route search method disclosed in the abovementioned patent publication, straight line distances from a departure location or a destination location to respective stations of available transportation facilities are obtained as routes using latitude/longitude information, and the average cost is calculated using the straight line distances obtained as variables.

In addition, a walking route is determined by retrieving information regarding the stations of all available means of transportation with the average cost being calculated within a pre-determined cost range. The walking route obtained is incorporated into the route traffic network of the particular transportation facility to form an integrated traffic network and thereby enable the computer to determine a route under desired cost conditions in accordance with the label determination method.

In searching for available walking and transport routes, the user may find that a particular station has a number of entry points and is thus accessible in a number of ways. This situation has been handled in a well-known route search method disclosed in Japanese Unexamined Patent Publication No. 2003-182578 and entitled "Optimum Route Searching Device and Method (see FIG. 9 and FIG. 10), which searches the shortest walking route from a departure location to the nearest station, as well as the shortest walking route from the station nearest to the destination location to the destination location.

Under the above-mentioned patent application, the optimum route search device, with the aid of an optimum route search means, determines one or more departure station candidates near the departure location and one or more destination station candidates near the destination location, using road, data and timetable data pertinent to the particular transportation facility in accordance with the searching order stipulating the searching conditions such as departure location, destination location, and scheduled departure time and date. In addition, the optimum route search device is configured to search for the optimum route incorporating both walking and transportation routes from among combinations of the departure station candidates and the destination station candidates to enable the user to move within the shortest timeframe from the departure location to the destination location according to specified searching conditions. Further, in the situation where the departure or destination station candidate is accessible in quite a number of ways, the optimum route search device is configured to search the optimum route by designating a single access nearest the departure location as the reference location of the departure or destination station candidate.

FIGS. 9 and 10 are typical illustrations showing the conventional route searching concept embodied in the optimum route search device disclosed in Japanese Unexamined Patent Publication No. 2003-182578. FIG. 9 is a typical illustration of the conventional concept for searching a route from a departure location (START) to the station nearest to the departure location and its entry points. FIG. 10 is a typical illustration of the conventional concept for searching a route from the station nearest to the destination location and its exit points leading to the destination location (GOAL).

In conducting route searching from a departure location to a destination location to determine an electric train route by searching the stations nearby, the optimum route search device (as shown in FIG. 9), sequentially searches the shortest walking routes RT1 to RT4, RT5, and RT6 from a departure location (START) to stations ST1 and ST2 near the departure location (START) and their entry accesses A1 to A4, A5, and A6 respectively. Accordingly, the number of searching times for the walking routes corresponds to the number of entry accesses.

Next, as shown in FIG. 10, the optimum route search device sequentially searches the shortest walking routes RP1, RP2, RF1, and RF2 from stations ST3 and ST4 near the destination location (GOAL), and their exit accesses B1, B2, B3, and B4 leading to the destination location (GOAL), respectively. Thus, the number of searching times for the walking routes corresponds to the number of exit points. In addition, in FIGS. 9 and 10, L1 to L4 denote electric train routes, and R0 denotes a radius indicating the range for extracting stations ST1 and ST2 near the departure location (START) and the stations ST3 and ST4 near the destination location (GOAL).

In addition to the above-mentioned function of route searching from a route search server where the destination and departure locations are specified as route searching conditions, the navigation system may also be capable of providing route options under various conditions even without designating a destination location. For example, a user may be looking for a parking lot near certain facilities since the vehicle should be parked. In this case, any parking lot adjacent to or closest to the targeted facility may be designated as a destination location.

The navigation system which makes such route searching possible has been disclosed in Japanese Unexamined Patent Publication No. 2003-057057 entitled "Method and System for Retrieving Information on Parking Lot and Program" (refer to paragraphs [0089], [0090] and FIG. 3, FIG. 6). The system for retrieving information on parking lots is configured such that when a network navigation center searches for routes according to specified route searching conditions from a navigation terminal, the network navigation center retrieves information on a number of parking lots near the designated destination location, searches for the shortest route to each parking lot and then guides the user to the nearest parking lot.

In addition, the network navigation center can also provide route information pertaining to a specific area such as a theme park or an exposition site (refer to FIG. 11 as an example). As shown in FIG. 11, three gates G1 to G3 are provided in the specific area or event site. Generally, a user will recognize the entire area as a destination location without regard to the number of gates therein and request for the nearest route leading to such gate or gates from a certain departure location.

In this case, similar to the method disclosed in Japanese Unexamined Patent Publication No. 2003-057057 of retrieving information on parking lots, a conventional route search server extracts gates G1 to G3 provided in the specific area requested to be searched, searches for the corresponding route from a departure location to each of gates G1 to G3, and provides for a guide in respect of the shortest route or recommends several routes ranked in order of proximity in relation to the departure location.

SUMMARY OF THE INVENTION

The above-mentioned information guide, including information on parking lots and the nearest entry point on the shortest walking route to a nearby station already form part of existing navigation systems. As disclosed in Japanese Unexamined Patent Publication No. 2003-057057, the route searching conducted by a network navigation center (route search server) of such configuration for the purpose of extracting information on parking lots near a destination location and searching routes leading to each parking lot is performed according to the following sequence.

Initially, the route search server repeatedly searches to extract information on available routes from a departure location to each parking lot to determine the shortest route to each parking lot. Once obtained, the route search server transmits such information in the order of proximity to the departure location to a terminal device.

FIG. 12 is a typical illustration of the conventional concept of searching for a route from a departure location (START) to a point of interest (POI) nearest a destination location. According to the conventional route search method illustrated in FIG. 12, when the POI within an area AR in the vicinity of the destination location is, for example, a parking lot, parking lots G1 to G5 are extracted. The route search server then searches for the optimum route from the departure location to the parking lot G1. In FIG. 12, arrows from the departure location (START) denote route search directions on a conceptual basis.

Next, the route search server searches optimum routes from the departure location (START) to the parking lot G2, and likewise to the parking lots G3, G4, and G5. In other words, the route search server conducts a search for routes for each of the parking lots G1 to G5, or five times. The information obtained on the parking lot nearest the departure location and the corresponding shortest route from the departure location to the nearest parking lot or two or three other route candidates ranked in the order of proximity to the departure location are then provided to a terminal device.

That is, in the navigation system disclosed in Japanese Unexamined Patent Publication No. 2003-057057, the number of route searches conducted by the route search server corresponds to the number of parking lots extracted, which would necessarily impose a considerable load on the search processing function of the route search server.

In a communication type navigation system, requests for route guides made to a route search server originate from each terminal device at random. This gives rise to the situation where the requests for route guides accumulate at one time, imposing a heavy burden on the search processing function of the route search server, leading to server shutdown or increase in waiting time at the terminal.

The same situation arises in the case of searching for walking routes from a departure location to a nearby station, because when the nearest station in particular has a number of entry points, the number of destination locations set by the route search server corresponds to the number of the entry points of the station and the number of routes to the destination location it searches corresponds to the number of entry points, in order to obtain the nearest entry point or access.

Users have various requirements and in addition to the above-mentioned cases where points of access to a station or parking lots are designated as searching conditions, users may request for information guide on access to a theme park or an EXPO venue having a plurality of entry points, or for access to certain POI such as convenience stores, gas stations, restaurants or hotels within the vicinity of a destination location.

The inventor of the present invention has derived a solution to address the above-mentioned problems, whereby a virtual node (having no specific location information on latitude and longitude) is connected through links having a link cost of "0" to nodes in which a plurality of POIs are located, is added to searching network data. Accordingly, it is possible for the navigation system to provide the shortest route from a departure location to a destination location through a one-time route search to the virtual node.

The present invention aims to provide a navigation system, a route search server, a route search method, and a route search program that can search for an optimum route through a one-time route searching process where several destination or departure locations exist.

To achieve the above-mentioned objective, a first aspect of the invention provides a navigation system searching for a route from a departure node to a destination node using searching network data, the system comprising a point of interest (POI) attribute information database accumulating POI attribute information, a network data edit means, and a virtual node setup means, whereby the navigation system determines whether there is a plurality of POIs existing in a departure location and/or a destination location by making reference to relevant data in the POI attribute information database, and where the navigation system has determined the existence of a plurality of POIs, the virtual node setup means sets up a virtual node (having no specific location information on latitude and longitude) for connection to each node of the various POIs through links having identical link cost, while the network data edit means adds the virtual node to the searching network data, and a route search means functions to search for routes using the searching network data containing the added virtual node.

Further, the link cost from the POI to the virtual node is equal to "0" in the aforementioned navigation system.

Further, the aforementioned navigation system comprises a navigation terminal transmitting route searching conditions and a route search server connected to the navigation terminal via a network.

A second aspect of the invention provides a route search server connected to a navigation terminal transmitting route searching conditions via a network, the route search server comprising a POI attribute information database accumulating POI attribute information, a network data edit means, and a virtual node setup means, wherein the route search server determines whether there is a plurality of POIs in a departure location and/or a destination location by making reference to relevant data in the POI attribute information database, and where the route server has determined the existence of a plurality of POIs, the virtual node setup means sets up a virtual node (having no specific location information on latitude and longitude) for connection to each node of the plurality of POI through links having a value similar to that of the link cost, while the network data edit means adds the virtual node to the searching network data, and a route search means functions to search for routes using the searching network data containing the added virtual node.

Further, the link cost from the POI to the virtual node is equal to "0" in the aforementioned route search server.

A third aspect of the invention provides for a route search method of searching a route from a departure node to a destination node using searching network data, wherein the navigation system includes a POI attribute information database accumulating POI attribute information, a network data edit means, and a virtual node setup means, where the route search method comprises the steps of determining whether there is a plurality of POIs in a departure location and/or a destination location by making reference to relevant data in the POI attribute information database and where the navigation system has determined the existence of a plurality of POIs, setting up a virtual node (having no specific location information on latitude and longitude) for connection to each node of the plurality of POIs through links having identical link cost by using of the virtual node setup means, and adding the virtual node to the searching network data by using the network data edit means, and searching routes with the aid of a route search means using the searching network data containing the added virtual node.

Further, the aforementioned route search method comprises the step of setting the link cost from the POI to the virtual node to "0".

A fourth aspect of the invention provides for a route search method in a navigation system including a navigation terminal transmitting route searching conditions and a route search server connected to the navigation terminal via a network, wherein the route search server comprises a POI attribute information database accumulating POI attribute information, a network data edit means, and a virtual node setup means, where the route search method comprises the steps of determining whether there is a plurality of POIs in a departure location and/or a destination location by making reference to relevant data in the POI attribute information database, and where it has been determined that a plurality of POIs exists, setting up a virtual node (having no specific location information on latitude and longitude) for connection to each node of the plurality of POIs through links having identical link cost by using the virtual node setup means, and adding the virtual node to the searching network data using the network data edit means, and searching routes with the aid of a route search means using the searching network data containing the added virtual node.

Further, the aforementioned route search method comprises the step of setting the link cost from the POI to the virtual node to "0".

A fifth aspect of the invention provides for a program which allows a computer constituting a route search server connected to a navigation terminal via a network transmitting route search conditions and including a POI attribute information database accumulating POI attribute information, a network data edit means, and a virtual node setup means, to execute the processes of determining whether there is a plurality of POIs in a departure location and/or a destination location by making reference relevant data in to the POI attribute information database, and where the navigation system has determined the existence of a plurality of POIs, setting up a virtual node (having no specific location information on latitude and longitude) for connection to each node of the plurality of POI through links having identical link cost by using the virtual node setup means and adding the virtual node to the searching network data by use of the network data edit means, and searching routes with the aid of a route search means using the searching network data containing the added virtual node.

Further, aforementioned program allows the computer constituting the route search server to execute a process of setting the link cost from the POI to the virtual node to "0".

According to the aforementioned first aspect, the navigation system includes a POI attribute information database accumulating attribute information of POI, a network data edit means, and a virtual node setup means and determines whether there is a plurality of POIs in a departure location and/or a destination location by making reference to relevant data in the POI attribute information database.

In addition, if there is a plurality of POIs, the virtual node setup means sets up a virtual node for connection to each node of the plurality of POIs through links having identical link cost, while the network data edit means adds the virtual node to the searching network data, and a route search means functions to search for routes using the searching network data containing the added virtual node.

Since the link cost attributed to each link connecting from the virtual node PN to each of the parking lots G1 to G5 is "0" and is not based on actual distances, the distances between the virtual node PN and the POIs are virtually equal to each other. Accordingly, if a route leading to a specific POI corresponds to the shortest distance, the route becomes the shortest of the routes from the departure location (START) to each POI. Accordingly, it is possible for the navigation system to provide the nearest one of a plurality of POIs and a route to the nearest POI through one-time route searching.

Furthermore, wherein the link cost from the POI to the virtual node is equal to "0", it is possible for the navigation system to perform route searching efficiently without the need to broaden or expand the range or scope of the search.

Furthermore, wherein the navigation system comprises a navigation terminal transmitting route searching conditions, and a route search server connected to the navigation terminal via a network, it is possible to provide a communication type navigation system. In addition, the route search server can provide the nearest one of a plurality of POIs and a route to the nearest POI through one-time route searching.

According to the aforementioned second aspect a route search server, the route search server can provide information on the nearest one of a plurality of POIs and a route to the nearest POI through one-time route searching.

According to the aforementioned third aspect, it is possible to provide information on the nearest one of a plurality of POIs and a route to the nearest POI through one-time route searching.

According to the aforementioned fourth aspect, the route search server can provide the nearest one of a plurality of POIs and a route to the nearest POI through one-time route searching.

According to the aforementioned fifth aspect, the route search server can provide the nearest one of a plurality of POIs and a route to the nearest POI through one-time route searching.

BRIEF DESCRIPTION OF THE DRAWINGS

FIG. 3 is a diagram showing data configuration in a database accumulating POI attribute information;

FIG. 12 is an explanatory view showing the conventional route search method of searching routes leading to a plurality of destination locations.

DESCRIPTION OF THE PREFERRED EMBODIMENTS

Figure 1:
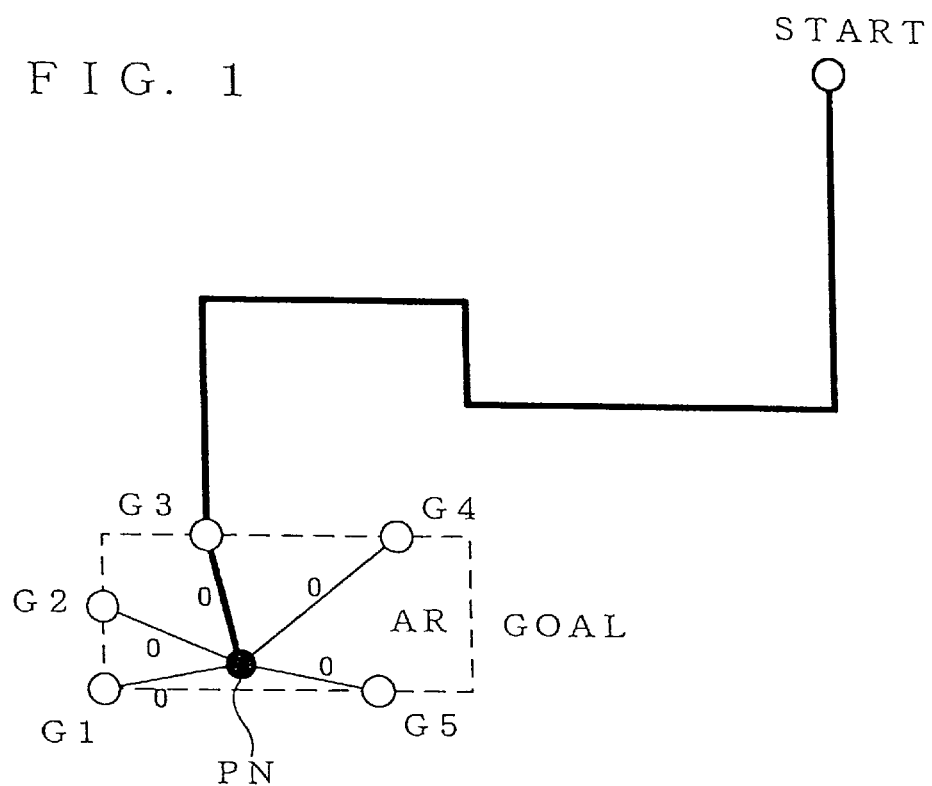
FIG. 1 is an illustration showing the concept of searching routes from a departure location to the nearest one of a plurality of POIs G1 to G5 located in an area AR within the vicinity of a destination location.

The preferred embodiments of the present invention will hereafter be described in detail with reference to the accompanying drawings. FIG. 1 is an illustration showing the concept of searching routes from a departure location (START) to the nearest one of a plurality of points of interest (POI) G1 to G5 located in an area (AR) within the vicinity of a destination location (GOAL).

Additionally, in the following embodiments of the present invention, a point of interest (POI) may refer to a departure location or a destination location including a plurality of locations and a station having a plurality of entry points. However, if a certain location definitely refers to an entry point to a station or a theme park, it shall be referred to as an entry point.

In FIG. 1, in the process of extracting parking lots G1 to G5 within the vicinity of a destination location (GOAL), a route search server sets up a virtual node PN connected through links having a link cost of "0" from node positions of each parking lot G1 to G5. The virtual node PN is temporarily connected to a route search network for the purpose of route searching and is used only for calculating the total link cost, and is a virtual point without specific latitudinal and longitudinal location information unlike nodes of the route search network. Also, since it is needed only for route searching, there is no need to display the virtual node. Accordingly, it is not at all necessary to assign or set location information values to the virtual node.

After the virtual node PN is set, the route search server searches for the optimum route GR from the departure location (START) to the virtual node PN. In this type of route searching, the link cost attributed to all links connecting from the virtual node PN to the individual parking lots G1 to G5 is "0" and is not based on actual distances. Thus, the respective distances between the virtual node PN and the individual parking lots G1 to G5 are virtually equal to each other.

Accordingly, if a route leading to a parking lot G3 is designated as the shortest route, the route would be the shortest one among routes extracted from the departure location (START) to each parking lot G1 to G5. Thus, it becomes possible to designate one of the parking lots G1 to G5 nearest to the departure location and the route to the nearest parking lot for transmission to a navigation terminal 20 through a one-time route search.

In this case, the cost of the particular link from each of the parking lots G1 to G5 to the virtual node PN need not logically be equal to one another and be uniformly assigned a corresponding value of "0". However, according to the Dijkstra method of diffusion, unless the link cost is "0", it is possible that only a part of the value of the route search may proceed to adjacent locations, thereby increasing processing time required for route searching.

If the link cost is "0", the route search process is terminated at the point where the searching reaches the virtual node PN. In other words, if the link cost value of the virtual node PN is equal to "0", efficient route searching can be performed.

Figure 2:
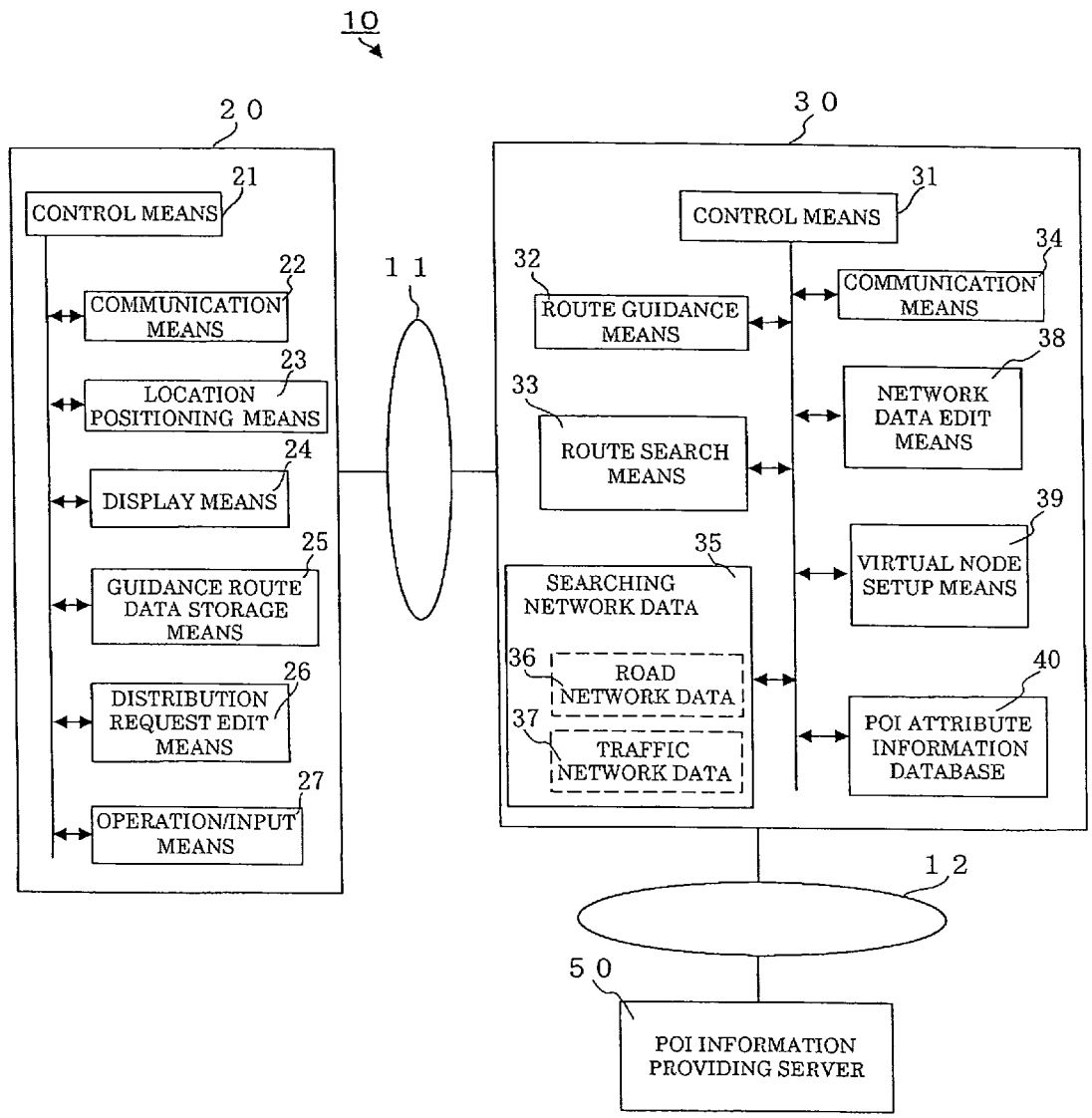
FIG. 2 is a block diagram showing the construction of a navigation system in accordance with an embodiment of the present invention.

FIG. 2 is a block diagram showing the construction of a navigation system in accordance with the embodiment of the present invention. As shown in FIG. 2, a navigation system 10 includes a navigation terminal 20 and a route search server 30 which communicate with each other via a network 11 such as the Internet.

The navigation terminal 20 designates and transmits route searching conditions such as a departure location and destination location by means of a route search request to the route search server 30. The route search server 30 searches for the optimum route in compliance with specified route searching conditions by referring to a network data searching unit consisting of road network data and traffic network data, edits the optimum route data yield into route guide data, and distributes it to the navigation terminal 20.

The route search server 30 includes searching network data 35 (database) and storing road network data 36 equipped with map data for route searching in a pedestrian navigation system or a car navigation system and traffic network data 37 for searching route sections applicable to transportation facilities, and a POI attribute information DB (database) 40 which accumulates POI attribute information.

As shown in FIG. 3, the POI attribute information accumulated in the POI attribute information DB 40 accumulates location coordinates (latitude and longitude) and attribute information with respect to each POI. The number of end-point nodes of links leading to the POI and location information of each node are accumulated in the attribute information DB 40. Further, various types of POI are also accumulated in the attribute information DB 40.

For example, since a point A of the POI represents a theme park A, and the number of links connected to the theme park, that is, the number of entry points, is three, locations of end-point nodes of the three links are accumulated. The situation is the same with respect to entry points to an event site in an exposition site, a theme park, or each station of transportation facility. The POI and their attribute information can, be collected by the route search server 30 through a network 12 from a POI information providing server 50 (see FIG. 2).

When the navigation terminal 20 makes a request to search for a route to a specific theme park or an event site as a destination location, the route search server 30 determines whether there is a plurality of entry points to the theme park or the event site by making reference to the POI attribute information DB 40. In case of route searching related to transportation facilities, when a station near a destination location or departure location is searched and/or a walking route to the nearby station is searched, the navigation system determines whether there is a plurality of entry points to the nearby station by making reference to the POI attribute information DB 40. If this is the case, the route search server 30 sets up the above-mentioned virtual node and accordingly performs a route search.

On the other hand, information related to a POI such as a parking lot, a gas station, a convenience store, or a hotel, information is recorded as attribute information. When the navigation terminal 20 requests the route search server 30 to search for a route to a specific POI near a destination location or departure location, as for example, a route to the nearest gas station is designated as a route search condition, the route search server 30 extracts the POI near the destination location or departure location by making reference to the POI attribute information DB 40. Also, the route search server 30 sets up the above-mentioned virtual node with the extracted POI defined as a plurality of destination locations to conduct searching of routes.

In the case where the process of searching routes leads to a plurality of POIs or yields searching routes including a destination or departure location having a plurality of entry points, a virtual node setup means 39, (see FIG. 2) sets up a virtual node PN connected through links having a link cost of "0" from nodes of the extracted POI or accesses, as described in FIG. 1. A network data edit means 38 temporarily adds the virtual node PN set up by the virtual node setup means 39 to existing data of the searching network data 35.

A route search means 33 makes a route search with the virtual node PN which is added to the searching network data 35 by the network data edit means 38 and designates a destination or departure location. It should be noted that when the navigation terminal 20 makes a typical request designating route search conditions to extract a route from a specific departure location leading to a destination location, the route searching process is performed using the searching network data 35 without the addition of the virtual node PN.

A route guidance means 32 edits and distributes data pertaining to optimum routes or a plurality of recommended guidance routes yielded by the route search means 33 to the navigation terminal 20. A communication means 34 receives various requests from the navigation terminal 20 or distributes various information to the navigation terminal 20.

Figure 4:
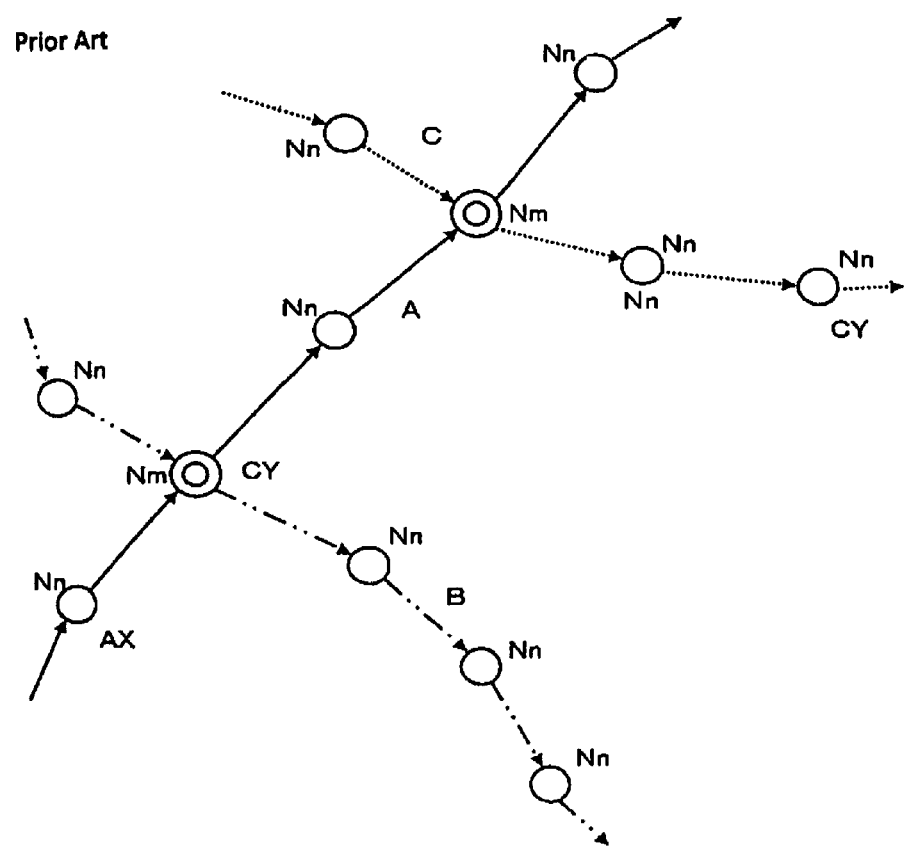
FIG. 4 is a typical illustration showing the conceptual data of a road network.

The road network data 36 for route searching in a pedestrian or car navigation system is constructed in the following manner. For example, in case of roads composed of A, B, and C as shown in FIG. 4, end-points, intersections, and curved points of the roads A, B, and C are marked as nodes. In this case, a road section connecting the nodes is indicated by a direct link, which consists of node data (latitude and longitude of a node) and link cost data containing link data (link number) and link cost (relating to the distance of a link or the time required to traverse the link) of each link.

That is, in FIG. 4, $N_n$, $N_m$ denote nodes while the $N_m$ denotes an intersection. A direct link connecting respective nodes is denoted by arrows (solid line, dotted line, and two-dot chain line). Although each link may be upward-directed or downward-directed, FIG. 4 shows only links drawn with arrows for simplification.

When route searching is performed and the road network data is used as a database, links connecting a departure node to a destination node are traced and their respective costs are accumulated so that a route having the minimum accumulated link cost can be located and provided. That is, in FIG. 4, when route searching is performed from a node AX as a departure location to a node CY as a destination location, links driving through road A from the node AX and making a right turn at the second intersection to enter road C and reaching the node CY are sequentially traced, and their link costs are accumulated so that a route having the minimum accumulated link cost can be located and provided.

Although there may be other existing routes, only the routes from the node AX to the node CY are depicted in FIG. 4. Thus, possible routes from the node AX to the node CY may be searched in the same manner so that a route with minimum link cost among the searched routes is determined to be an optimum route. This is performed through a known method such as the Dijkstra method.

Figure 5:
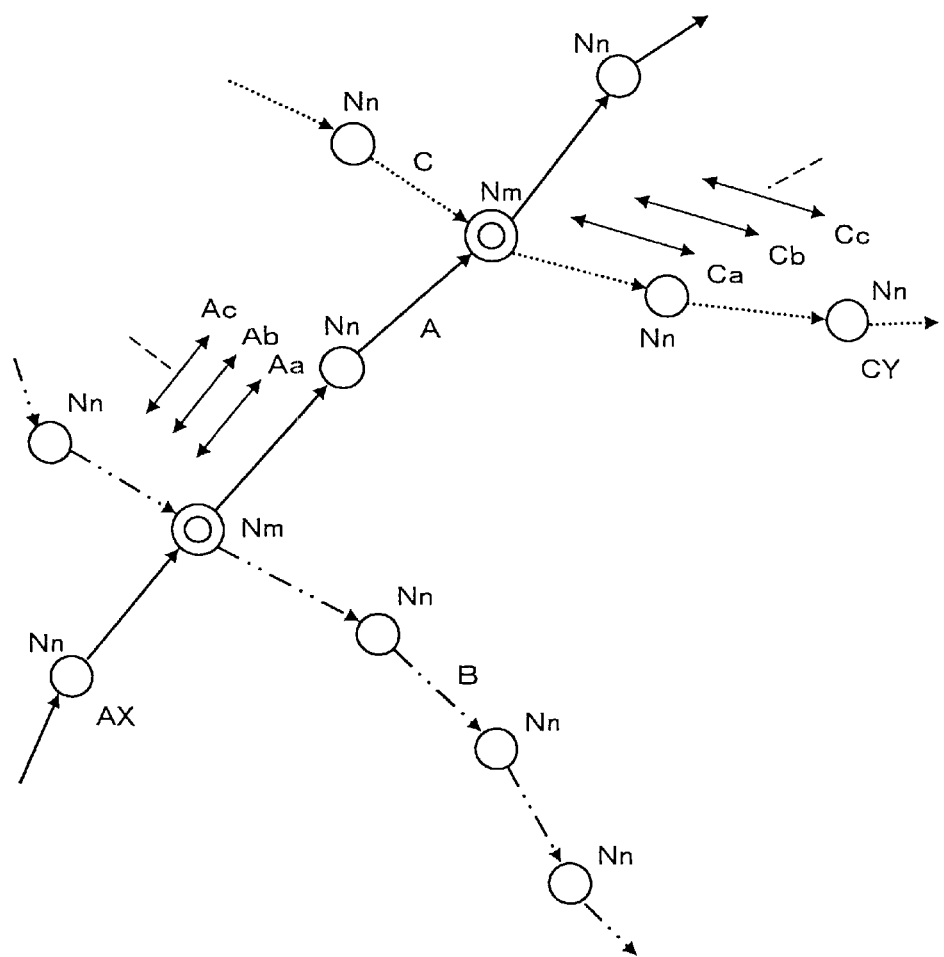
FIG. 5 is a typical illustration showing the conceptual data of a traffic network.

The traffic network data 37 for searching routes of available transportation facilities is configured as follows. For example, in a traffic route consisting of routes A, B, and C as shown in FIG. 5, each station (each airport in case of an aircraft route) provided on each traffic route A, B, and C is designated as a node, a section connecting respective nodes is indicated by a direct link, and node data (latitude and longitude) and link data (link number) are designated as network data. In FIG. 5, $N_n$, $N_m$ denote nodes while the $N_m$ denotes a transfer location (transfer station). Also, a direct link connecting respective nodes is denoted by arrows (solid line, dotted line, and two-dotted chain line). Although each link may be upward-directed or downward-directed, FIG. 5 shows only links drawn with arrows for simplification.

However, the link cost of a traffic network is basically different from that of a road network. Accordingly, although the link cost of the road network is fixed and static, there are a number of trains or aircraft (hereinafter, routes of the individual trains or aircraft are referred to as "Transportation Facilities") operating on traffic routes as shown in FIG. 5. The respective transportation facilities have node departing time and node arriving time schedules (which are described as timetable data and operating data). In addition, individual routes may not always be linked to adjacent nodes. For example, there are express trains and regular trains which stop at every station. In such cases, a plurality of different links exists on the same traffic route and the travel time between nodes may differ from each other depending on the transportation facility used.

In the traffic network shown in FIG. 5, there is a plurality of transportation facilities (routes) Aa to Ac on the same link of the traffic route A, and a plurality of transportation facilities (routes) Ca to Cc on the same link of the traffic route C. Thus, unlike a simple road network, in the traffic network, the amount of data regarding each node, link, and link cost is proportional to the total number of transportation facilities (routes of the individual aircraft or trains). In other words, the traffic network has enormous data compared to the road network, thereby requiring considerable time to search for routes.

To search for a route from a departure location leading to a destination location using such traffic network data, it is necessary to search all available transportation facilities and to determine a specific transportation facility that meets the searching conditions.

For example, in FIG. 5, when route searching is performed from the node AX of the traffic route A designated as a departure location to the node CY of the traffic route C designated as a destination location at a specific departure time, all kinds of transportation facilities after the departure time among the transportation facilities Aa to Ac operating on the traffic route A are sequentially selected as routes at departure time. On the basis of the arrival time at a transfer node leading to the traffic route C, all combinations of transportation facilities after the available boarding time in the transfer node among the respective transportation facilities Ca to Cc operating on the traffic route C are searched so that data regarding the time span of each route or the number of required transfer times are accumulated and provided for purposes of guiding users.

Meanwhile, the navigation terminal 20 is provided with a control means 21, a communication means 22, a location positioning means 23, a display means 24, a route guide data storage means 25, a distribution request edit means 26, and an operation/input means 27. The location positioning means 23 receives and processes GPS satellite signals using a GPS receiver provided therein and locates the current position or location (latitude and longitude) of the navigation terminal 20.

The communication means 22 having a radio communication unit communicates with the route search server 30. The operation/input means 27 is made up of keys and dials and is used as input function to input a departure location, a destination location and the like for operating the navigation terminal 20. The display means 24 consists of a liquid crystal display panel or the like, and is used to display route guides and maps distributed from the route search server 30. The display means 24 also acts as input means for operating the navigation terminal 20 by displaying a menu screen. The distribution request edit means 26 writes a route search request to be transmitted to the route search server 30 using a departure location and a destination location inputted through the operation/input means 27 or the current location of the navigation terminal 20 positioned by the location positioning means 23 as a departure location, based on these information.

The route guide data storage means 25 stores route search results, such as route guide data, map data, and guidance information, which are distributed from the route search server 30. Such data are read out from the route guide data storage means 25 as the occasion may demand and displayed on the display means 24. Generally, the route search data yield and a mark indicating the current location of the navigation terminal 20 are superposed on a scaled map including the current location of the navigation terminal 20, positioned by the location positioning means 23, so that the mark indicating the current location will rest in the center of the display screen.

When information given on the current location (information about latitude and longitude) positioned by the location positioning means 23 using a received GPS satellite signal is in error, such as when the current location deviates from the guided route, a route matching process ensues to shift the current location onto the guidance route. Also, when the guidance route data distributed from the route search server 30 includes a voice guide (for example, a voice message such as "An intersection is located 300 meters ahead. Please turn left"), the voice message is reproduced and outputted through a speaker to guide the user.

Figure 6:
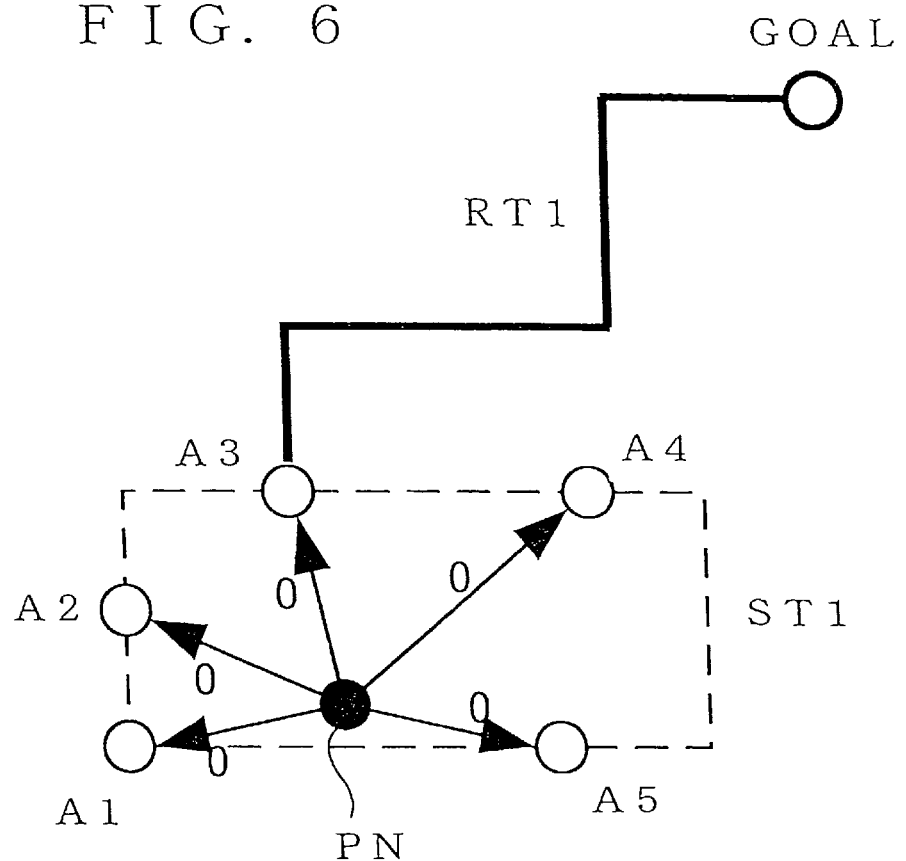
FIG. 6 is an explanatory view showing the route searching concept in a departure location for a station having a plurality of entry points.

The route search method of the navigation system 10 according to the above-mentioned embodiment of the present invention will hereafter be described. The route search concept of the present invention in which a plurality of entry points or POIs exist in a destination location is the same concept previously described with reference to FIG. 1. The same route search can be performed in a departure location. FIG. 6 is a view showing a case in which a station ST1 on a departure location has a plurality of entry points A1 to A5 with respect to a destination location (GOAL).

When a search is conducted for a station ST1 near the departure location, the route search server determines whether a plurality of entry points exist by making reference to the POI attribute information pertaining to the station ST1 of the PO attribute information DB 40. As shown in FIG. 6, when the station ST1 has a plurality of entry points A1 to A5, a virtual node PN connected through links having a link cost of "0" from node positions of the entry points A1 to A5 is set up. Since the virtual node PN is temporarily connected to a route search network for the purpose of route searching, it need not have latitudinal and longitudinal location information.

When the virtual node PN is set, the route search server searches an optimum route GR from the virtual node PN leading to the destination location (GOAL). Since the link cost attributed to all the links connecting from the virtual node PN to each entry point A1 to A5 is "0" and is not based on actual distances, the distances between the virtual node PN and the entry points A1 to A5 are virtually equal to each other.

Accordingly, if a route RT1 leading to the entry point A3 is the shortest distance, the route becomes the shortest of the routes leading to the entry points A1 to A5 in the departure location. Thus, it is possible to provide one of the entry points A1 to A5 nearest the destination location (GOAL) and the route to the destination location (GOAL) for the navigation terminal 20 through a one-time route search.

Figure 7:
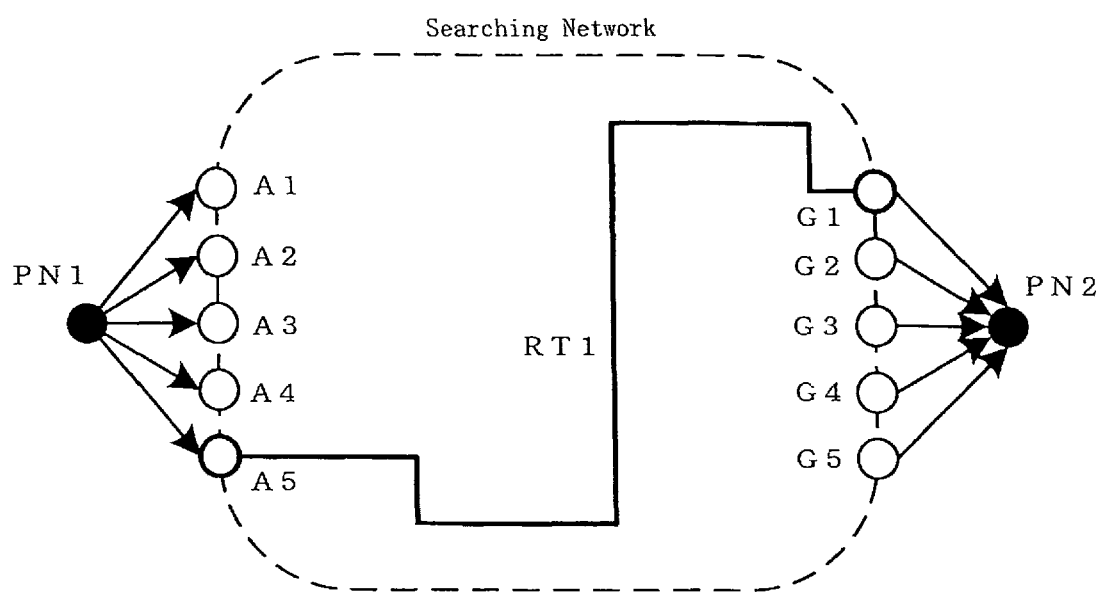
FIG. 7 is an explanatory view showing the route searching concept in the case where there is a plurality of entry points or POIs on either or both the departure location and destination location.

Similarly, it is possible to search for routes to departure and destination locations each having a plurality of entry points or POIs. FIG. 7 is an explanatory view showing such route search concept. FIG. 7 shows a route search request originating from the navigation terminal 20 in which there is a plurality of entry points A1 to A5 of a station in a POI near the departure location and there is a plurality of entry points G1 to G5 in a POI such as a theme park in the destination location.

When the navigation terminal 20 requests the route search server 30 to search for such a route, the route search server 30 first determines whether the departure location and the destination location have a plurality of entry points by making reference to the POI attribute information DB 40. If there is such a plurality, each of the entry points A1 to A5 and G1 to G5 is extracted. Next, the virtual node setup means 39 sets up a virtual node PN1 connected through links having a link cost of "0" to each of the entry points A1 to A5 on the departure location, and also sets up a virtual node PN2 connected through links having a link cost of "0" from each of the entry points G1 to G5 on the destination location.

Next, in the route search server 30, the network data edit means 38 temporarily adds the virtual nodes PN1, PN2 to the searching network data 35. In FIG. 7, a dotted line typically shows a searching network and the virtual nodes PN1, PN2 are added. The route search means 33 searches for an optimum route from the virtual node PN1 to the virtual node PN2 using the searching network data 35.

This search can be performed through a typical method used in a general route searching process, such as the Dijkstra method. That is, an actual route searching range is positioned on an actual searching network, but by setting up the virtual node PN1 (on the departure location side) and the virtual node PN2 (on the destination location side), an optimum route obtained therebetween is characterized to identify both the departure location and the destination location at the same time.

Since the link cost between the virtual node PN1 and each of the entry points A1 to A5 is equal to "0" and the link cost between the virtual node PN2 and each of the entry points G1 to G5 is equal to "0", the shortest route RT1 from the virtual node, PN1 to the virtual node PN2 is obtained as a result of route searching. Thus, the entry point A5 on the departure location side and the entry point G1 on the destination location side which establish the shortest route RT1 become the optimum entry points on the departure location side and destination location side, respectively.

In addition, in FIG. 7, since the departure location side indicates a transportation facility station within a predetermined range from the departure location, the route RT1 becomes the transportation facility route. Also, route guide data including a station near the entry point G1 of the theme park on the destination location side and a walking route from the nearby station to the entry point G1 are searched, thereby providing a comprehensive route RT1. A route originating from the departure location and leading to an entry point, i.e., A5 in this case, of the nearby station on the departure location side is searched as a walking route.

Figure 8:
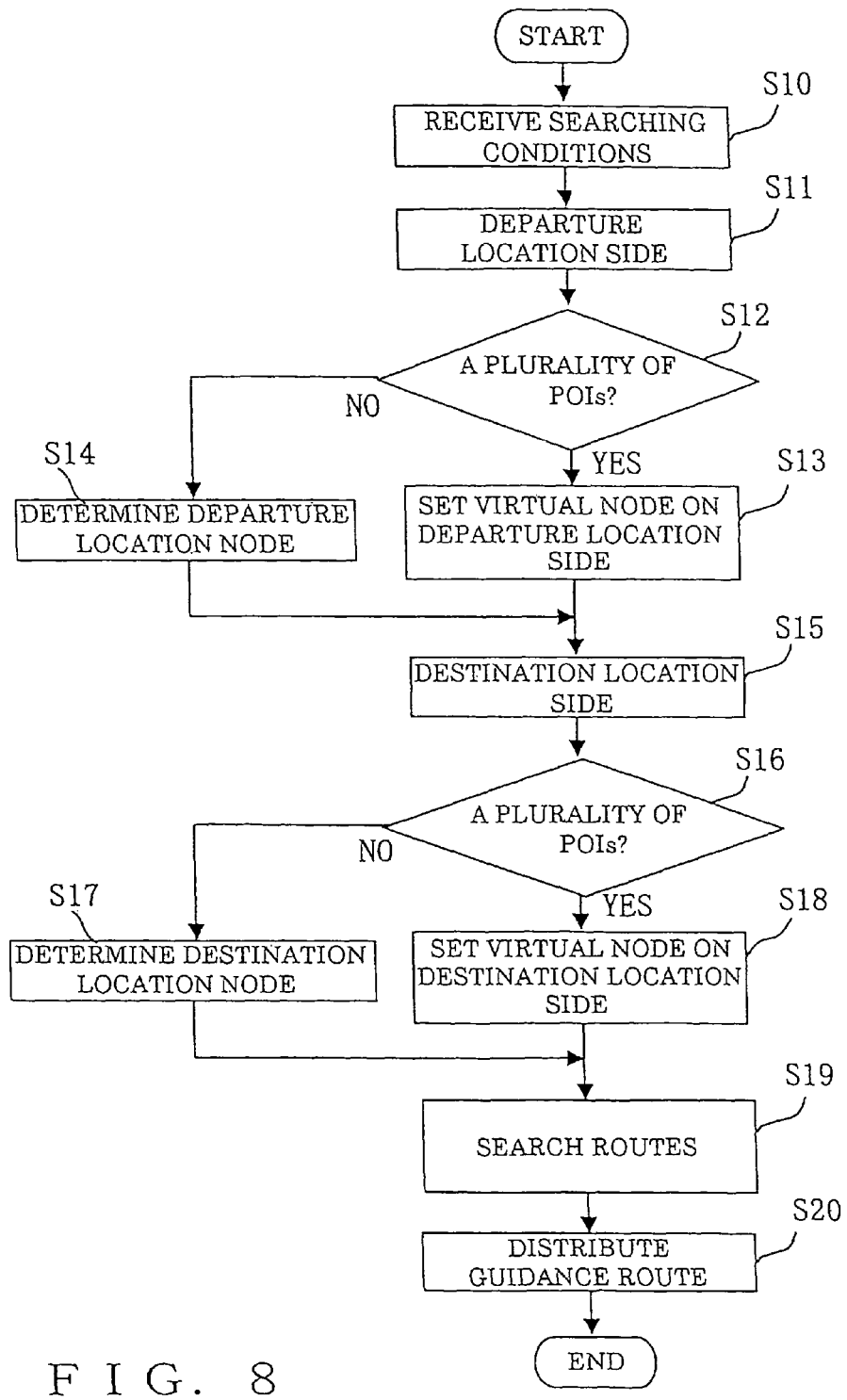
FIG. 8 is a flow chart showing the route search sequence of a navigation system in accordance with the present invention.
Figure 9:
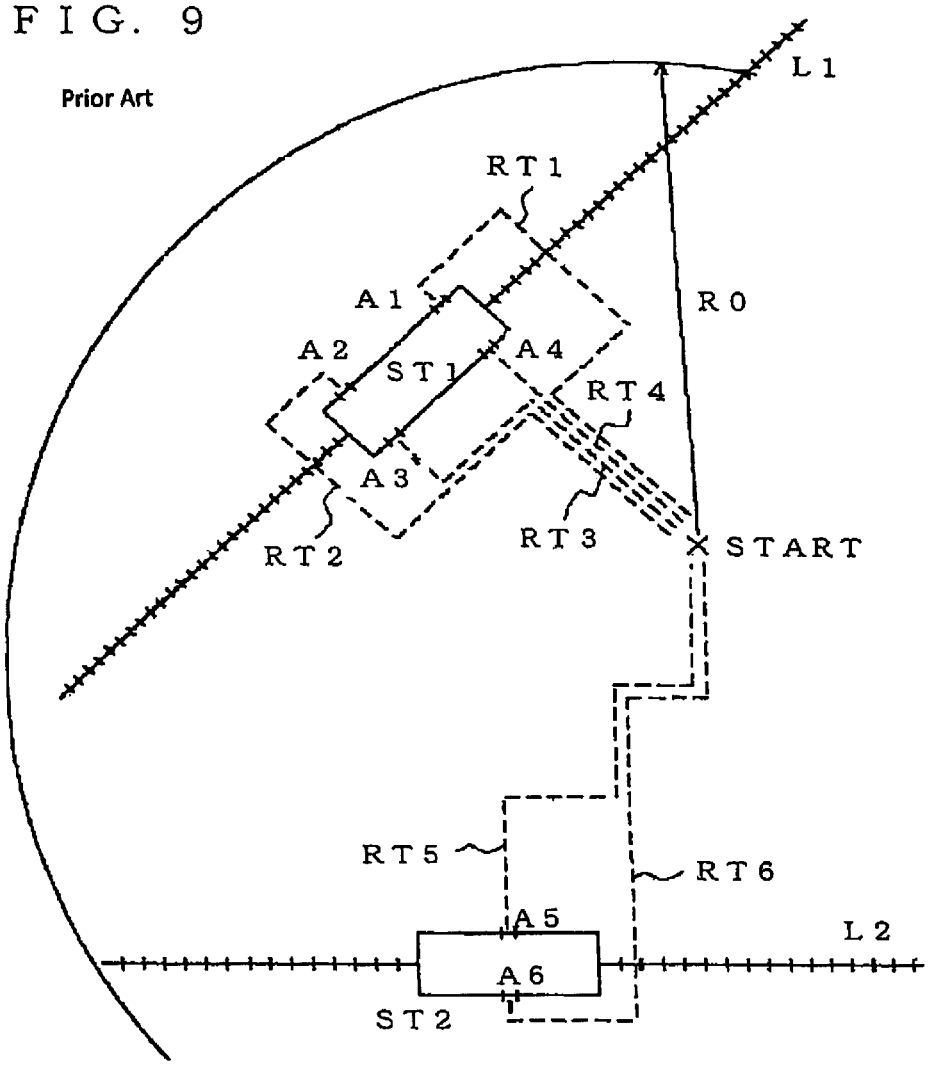
FIG. 9 is an explanatory view showing the conventional concept of a route search method searching a route from a departure location to a nearby station having a plurality of entry points.
Figure 10:
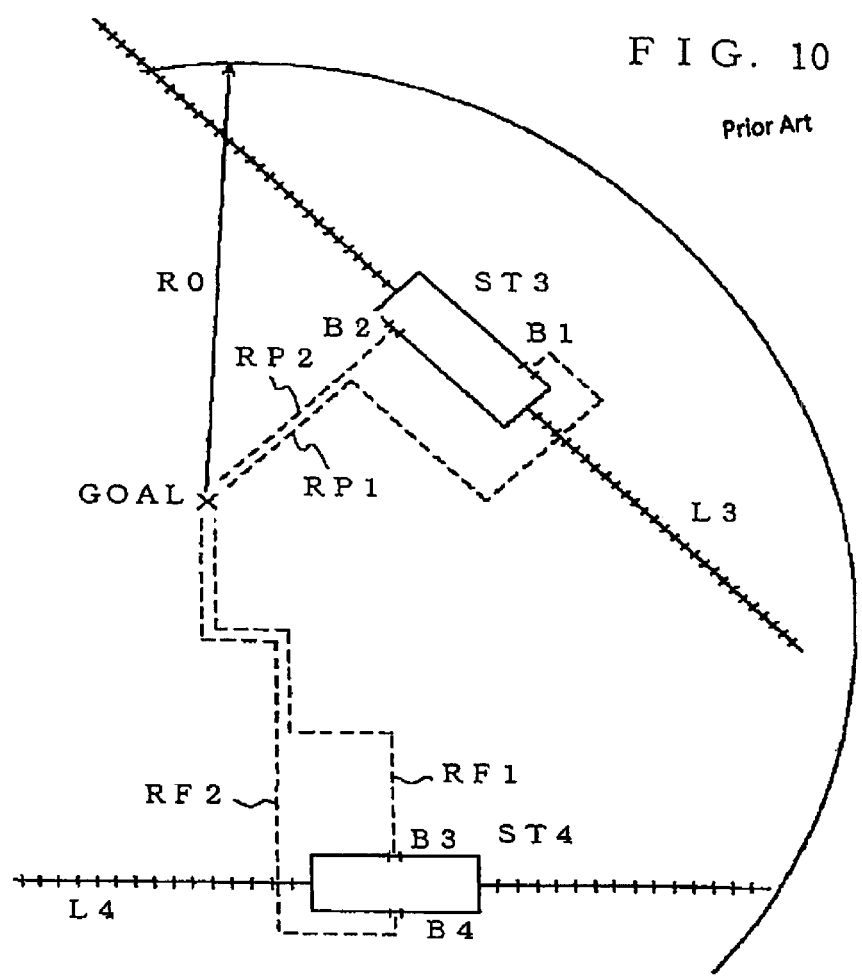
FIG. 10 is an explanatory view showing the conventional concept of a route search method searching a route from a nearby station having a plurality of entry points to a destination location.
Figure 11:
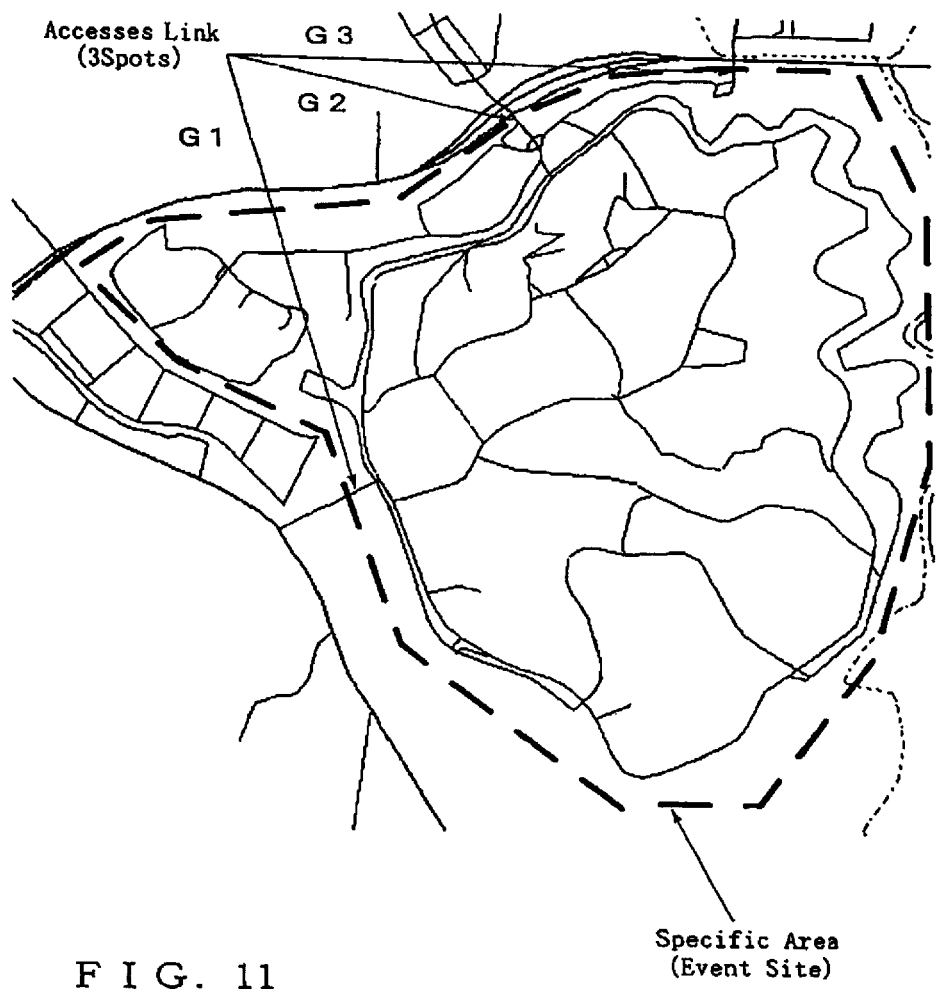
FIG. 11 is an explanatory view showing the concept of searching a route to a specific area having a plurality of entry points such as a theme park.

The above-mentioned route search sequences of the navigation system according to the present invention will now be described with reference to a flow chart shown in FIG. 8. In processing step S10, the route search server 30 receives route searching conditions from the navigation terminal 20.

Upon receipt of the route searching conditions, the route search server 30 inspects the conditions existing on the departure location side in processing step S11, and determines whether there is a plurality of POIs on the departure location side by making reference to the POI attribute information DB 40 in processing step S12. Unless there is a plurality of POIs on the departure location side, the route server 30 proceeds to processing step S14 by which it determines the departure location as a departure node.

In processing step S12, if there is a plurality of POIs on the departure location side, the virtual node setup means 39 sets up a virtual node (the departure location side) connected through links having a link cost of "0" from each node of the plurality of POIs and proceeds to processing step S15. In step S15, the route search server 30 inspects the conditions existing on the destination location side. In processing step S16, the route search server 30 determines whether there is a plurality of POIs on the destination location side by making reference to the POI attribute information DB 40. Unless there is a plurality of POIs on the side of the destination location, the route search server 30 proceeds to processing step S17 and sets the destination location as a destination location node.

When it is determined in step S16 that there is a plurality of POIs on the side of the destination location, the virtual node setup means 39 sets up a virtual node (on the destination location side) connected through links having a link cost of "0" from each node of the plurality of POIs in processing step S18 and proceeds to processing step S19. In step S19, the network data edit means 38 temporarily adds the virtual nodes of both sides of the departure and destination location set by the virtual node setup means 39 to the network data searching unit, and the route search means 33 searches for an optimum route from the virtual node on the side of the departure location to the virtual node on the side of the destination location using the network data searching unit to which the virtual nodes are added.

In addition, if there is no plurality of POIs on either side and the departure location or destination location is determined to be the departure location node or destination location node in processing step S14 or S17, it should be noted that such departure location node or destination location node is used instead of the virtual node in processing step S19.

In step S19, an optimum route is searched by the route search means 33. In processing step S20, the route search server 30 distributes the route guide data yield to the navigation terminal 20 and then terminates the process. Having received the route guide data, the navigation terminal 20 temporarily stores the same in the route guide data storage means 25, and displays a map and route guide information on the display means 24.

In addition, although the present embodiment is configured in such manner that the virtual node is set up by making reference to the POI attribute information DB 40 in case of a theme park having a plurality of entry points, the present invention may be configured such that data pertinent to the virtual node is accumulated in the POI attribute information DB 40 and the virtual node setup means 39 obtains the data of the virtual node from the POI attribute information DB 40.

INDUSTRIAL APPLICABILITY

The route search method according to the present invention can be used to conduct various types of searches in which a plurality of destination locations or departure locations is assumed to exist. It is effective for searching gas stations when applied in a car navigation system or for searching convenience stores through a pedestrian navigation system. The searching itself can be performed using conventional algorithm, or by means of a stand-alone device such as a car navigation system without the need to modify existing programs significantly.

What is claimed is:

1. A navigation system searching a route from a departure node to a destination node using a network data searching unit, the system comprising:
    a point of interest (POI) attribute information database storing POI attribute information;
    a network data edit unit; and
    a virtual node setup unit,
    wherein the navigation system determines whether there is a plurality of POIs existing in a departure location and/or a destination location by making reference to relevant data in the POI attribute information database,
    wherein, when the navigation system has determined a plurality of POIs, the virtual node setup unit sets up a virtual node for connection to each node of the plurality of POIs through links having identical link cost,
    wherein the network data edit unit temporarily adds a link cost of the virtual node to a link cost of the network data searching unit, and a route search unit configured to search for routes using the link cost of the network data searching unit and the temporarily added link cost of the virtual node, and
    wherein the virtual node is a virtual point without a specific longitude and latitude.

2. The navigation system according to claim 1, wherein the link cost from each POI to the virtual node is equal to "0".

3. The navigation system according to claim 1, further comprising a navigation terminal transmitting route searching conditions, and a route search server connected to the navigation terminal via a network.

4. A route server connected to a navigation terminal transmitting route searching conditions via a network, the route search server comprising:
    a POI attribute information database storing POI attribute information, a network data edit unit and a virtual node setup unit,
    wherein the route search server determines whether there is a plurality of POIs in a departure location and/or a destination location by making reference to relevant data in the POI attribute information database,
    wherein, when the route server has determined a plurality of POIs, the virtual node setup unit sets up a virtual node for connection to each node of the plurality of POI through links having identical link costs,
    wherein the network data edit unit temporarily adds a link cost of the virtual node to a link cost of a network data searching unit, and a route search unit configured to search for routes using the link cost of the network data searching unit and the temporarily added link cost of the virtual node, and
    wherein the virtual node is a virtual point without a specific longitude and latitude.

5. The route search server according to claim 4, wherein the link cost from each POI to the virtual node is equal to "0".

6. A route search method of searching a route from a departure node to a destination node using a network data searching unit, wherein the navigation system includes POI attribute information database storing POI attribute information, a network data edit unit and a virtual node setup unit, the route search method comprising:
    determining whether there is a plurality of POI in a departure location and/or a destination location by making reference to relevant data in the POI attribute information database; if the navigation system has determined a plurality of POIs, setting up a virtual node for connection to each node of the plurality of POIs through links having identical link cost by using the virtual node setup unit;
    temporarily adding a link cost of the virtual node to a link cost of the network data searching unit by using the network data edit unit, and searching routes, with the aid of a route search unit, using the link cost of the network data searching unit and the temporarily added link cost of the virtual node,
    wherein the virtual node is a virtual point without a specific longitude and latitude.

7. The route search method according to claim 6, further comprising the step of setting the link cost from each POI to the virtual node to "0".

8. A route search method in a navigation system including a navigation terminal transmitting route searching conditions and a route search server connected to the navigation terminal via a network,
wherein the route search server includes a POI attribute information database storing POI attribute information, a network data edit unit, and a virtual node setup unit,
the method comprising:
determining whether there is a plurality of POIs in a departure location and/or a destination location by making reference to relevant data in the POI attribute information database;
if the navigation system has determined a plurality of POIs, setting up a virtual node for connection to each node of the plurality of POIs through links having identical link cost by using the virtual node setup unit;
temporarily adding a link cost of the virtual node to a link cost of a network data searching unit by using the network data edit unit, and searching routes with the aid of a route search unit using the link cost of the network data searching unit and the temporarily added link cost of the virtual node
wherein the virtual node is a virtual point without a specific longitude and latitude.

9. The route search method according to claim 8, further comprising the step of setting each link cost from the POI to the virtual node to "0".

10. A program executed and stored in a computer readable medium which allows a computer constituting a route search server connected to a navigation terminal via a network transmitting route search conditions and including a POI attribute information database storing POI attribute information, a network data edit unit, and a virtual node setup unit, to execute processes comprising:
determining whether there is a plurality of POIs in a departure location and/or a destination location by making reference to relevant data in the POI attribute information database;
if the navigation system has determined a plurality of POIs, setting up a virtual node for connection to each node of the plurality of POIs through links having identical link cost by using the virtual node setup unit; and
temporarily adding a link cost of the virtual node to a link cost of a network data searching unit by using the network data edit unit, and searching routes, with the aid of a route search unit, using the link cost of the network data searching unit and the temporarily added link cost of the virtual node,
wherein the virtual node is a virtual point without a specific longitude and latitude.

11. The program according to claim 10, which allows the computer constituting the route search server to execute a process of setting the link cost from each POI to the virtual node to "0".

12. A method comprising:
receiving a route search request comprising a departure location and a destination location; and
searching, with reference to navigation data, for a route between the departure location and the destination location,
wherein the method further comprises:
determining, with reference to a points of interest (POI) database, whether points of interest (POI) are present in the vicinity of one or both of the departure location and the destination location;
setting up a first virtual node on the departure location side and including the first virtual node in the navigation data if one or more points of interest are present in the vicinity of the departure location, wherein the first virtual node is connected by first links to the points of interest in the vicinity of the departure location, each first link having the same link cost; and
setting up a second virtual node, having no location information on latitude and longitude, on the destination location side and including the second virtual node in the navigation data if one or more points of interest are present in the vicinity of the destination location,
wherein the first virtual node is connected by second links to the points of interest in the vicinity of the destination location, each second link having the same link cost,
wherein the searching for a route comprises one-time searching with reference to the network data which includes any set-up first or second virtual node, and
wherein the virtual node is a virtual point without a specific longitude and latitude.

13. The method according to claim 12, wherein the link cost of each first link and each second link is zero.

14. The method according to claim 12, wherein no location information values are assigned to the first or second virtual nodes.

15. A route search server comprising one or more processing systems configured to perform the method of claim 12.

* * * * *